United States Patent [19]
Waldron et al.

[11] Patent Number: 5,863,242
[45] Date of Patent: Jan. 26, 1999

[54] FIBER OPTIC CONNECTOR POLISHING APPARATUS

[75] Inventors: Mark R. Waldron, Poplar Grove; Philip W. Schofield, Oak Park, both of Ill.

[73] Assignee: Methode Electronics, Inc., Chicago, Ill.

[21] Appl. No.: 770,434

[22] Filed: Dec. 20, 1996

[51] Int. Cl.$^6$ .................................................. B24B 41/06
[52] U.S. Cl. .......................... 451/390; 451/386; 451/41; 451/364; 451/557
[58] Field of Search ................................... 451/390, 557, 451/42, 260, 255, 256, 277, 323, 391, 386, 384, 43, 44, 364

[56] References Cited

U.S. PATENT DOCUMENTS

| | | | |
|---|---|---|---|
| 4,693,035 | 9/1987 | Doyle | 451/41 |
| 5,140,779 | 8/1992 | Grois | 451/386 |
| 5,201,148 | 4/1993 | Rupert et al. | 451/364 |
| 5,216,846 | 6/1993 | Takahashi | 451/390 |
| 5,321,917 | 6/1994 | Franklin et al. | 451/386 |
| 5,547,418 | 8/1996 | Takahashi | 451/390 |
| 5,643,064 | 7/1997 | Grinderslev et al. | 451/41 |

*Primary Examiner*—Robert A. Rose
*Assistant Examiner*—George Nguyen
*Attorney, Agent, or Firm*—David L. Newman

[57] ABSTRACT

A polishing apparatus is provided for holding at least one fiber optic connector ferrule in an upright position while allowing the face portion the ferrules to be held firmly against a planar sheet of ferrule polishing paper. The apparatus can be manually maneuvered over said polishing paper thereby polishing the face portion of the ferrules inserted therein. The polishing apparatus includes a disc having a polishing surface and an upper surface opposite said polishing surface. A plurality of ferrule receiving apertures are formed in the disc for receiving various connector ferrules. Support skirts surround each aperture, extending upward from said upper surface. The ferrule support skirts define internal circular bores communicating with the polishing surface such that fiber optic connector ferrules may be inserted into the bores with the face portion of said ferrules extending beyond said polishing surface. A grasping ring is integrally molded with the disc and provides a means by which a technician can grasp the apparatus and maneuver the apparatus over a piece of polishing paper. Tooling support members are integrally formed with the grasping ring and are configured to accept tooling support shaft extending from a holddown tool designed to apply a normal force against the ferrules to firmly hold them against the polishing paper. Wear resistant surfaces in the form of hardened spheres protrude slightly from cavities formed in the polishing surface of the apparatus to protect the polishing surface from abrasive action of the polishing paper.

20 Claims, 2 Drawing Sheets

FIBER OPTIC CONNECTOR POLISHING APPARATUS

BACKGROUND OF THE INVENTION

The present invention relates to an apparatus for hand polishing various style fiber optic connectors. Specifically, the polishing apparatus is disc shaped and is configured to receive the ferrule portion of SC, SC Duplex, ESCON, ST, FC, MP, FDDI, or other planar multifiber connectors.

Fiber optic cables allow information signals to be transmitted from one point to another using light signals carried on a single glass fiber. During the installation of fiber optic systems, it is often necessary perform field splices to join separate fiber optic cables together so that light signals can be transferred over distances greater than the length of a single cable. Splicing fiber optic cables requires precise alignment of the individual fibers being joined in order to provide a noninterrupted fiber path for the light signals to travel through. The joined fibers must be both axially and radially aligned to ensure that the light signal is transferred from one fiber to the next.

Precision fiber optic connectors are provided to achieve proper alignment between independent optical fibers within a fiber optic splice. Such connectors include alignment ferrules made of ceramic, plastic, or some other rigid material. Each ferrule is formed with at least one internal channel for receiving an optical fiber, depending on the style of connector. A fiber optic cable is stripped to a predetermined length so that the signal carrying fiber strand or multiple strands are exposed. Epoxy is then inserted into the internal channels of the ferrule. Individual fiber strands are then inserted into the individual channels until they extend beyond the front face of the ferrule. The Epoxy is then allowed to cure so as to firmly secure the fiber strand or strands within the ferrule. Once the epoxy has set, the fiber strands are cleaved as near to the epoxy as possible using a sharp blade. The face of the ferrule is then polished to provide a smooth flat surface which can be placed in direct face to face abutment against a similarly prepared ferrule. When making the connection between the two cables, the shape of the two ferrules and their associated connector hardware ensure that the fibers contained within ferrules will be axially aligned. Polishing the face of the ferrules ensures that the optical fiber or fibers within the ferrule will have smooth flat surfaces perpendicular to the axis of the fiber. Thus, when the faces of the ferrules are abutted up against one another, the surfaces of the adjacent fibers will be flush with one another such that throughout the length of the ferrules the two strands are held in linear alignment, thereby allowing light signals to pass from one strand to the next without interruption.

From the above description, it should be clear that polishing the face of the connector ferrules is a key step in performing a successful fiber optic splice. In many cases, splices are being made in the field as the fiber optic cables are being installed rather than in the factory where the connectors are made. Under field conditions it is generally necessary to polish the ferrules by hand. This is most readily accomplished by inserting the ferrule into a polishing disc specifically designed for this task, and rubbing the disc over various grades of polishing film.

Polishing discs are known in the art. Such disks are generally formed having a planar lower polishing surface and having a ferrule receiving hole, or holes, extending through the disc perpendicular to the lower polishing surface. The ferrule receiving hole or holes are configured to receive the ferrules of a particular fiber optic connector style. To polish a single ferrule, the ferrule is inserted into a ferrule receiving hole until the end of the ferrule protrudes slightly from the lower polishing surface of the disc. A piece of polishing paper is then laid out on a flat surface and the polishing disc placed over the polishing paper, with the lower polishing surface of the disc engaging the polishing paper. The polishing disc is then rubbed vigorously over the polishing paper. The lower polishing surface of the polishing disc acts as a reference plane, and the rough surface of the ferrule face extending beyond the reference plane will be worn away by the action of the polishing paper. This process is usually carried out a number of times using a finer and finer grade polishing paper with each iteration. The result is a clean, smooth, and flat face portion of the fiber strand contained within the ferrule. The process can also be applied to multiple ferrule connectors, provided that properly spaced ferrule receiving holes are provided.

Differing fiber optic applications will often have differing connector requirements. In some applications where large amounts of data to be must be transferred, more than one fiber will be necessary to accommodate all of the data flow. For example, many applications require separate transmit and receive lines for bi-directional communication between devices. Other applications may simply require a large number of fibers in order to transfer massive amounts of data. Yet another application may require only a single fiber strand. To accommodate this wide variety of fiber optic applications, a wide variety of fiber optic connector styles has developed. SC, ST, and FC style connectors are all single fiber connectors. Each of these connectors has a single ferrule encasing a single fiber, the differences between these styles lie in the manner in which the outer casings of the connectors are connected. The SC Duplex connector is basically two single SC connectors clipped together in a predefined manner, and having a predefined spacing between the two ferrules for accommodating bi-directional data transfer. Thus, splicing utilizing an SC Duplex connector requires the polishing of two conjoined ferrules. Similarly, the ESCON and FDDI connectors are two ferrule connectors having a single rigid connector body. The two ferrules, each containing a single fiber, extend from the connector body with a wider standard spacing than the SC Duplex standard spacing. Finally, the MP connector is a single ferrule connector capable of holding multiple fibers (as many as twelve fibers) within the single ferrule. While the ferrules of the SC, ST, FC, and ESCON are all round, the MP ferrule and other planar multifiber connector ferrules are generally rectangular in shape, having beveled lateral sides.

Until now, with the exception of the single fiber connectors such as the SC, ST and FC, a separate polishing disc has been required to polish each style connector in order to accommodate the various arrangements of the connector ferrules. Thus, the wide variety of connector styles employed by fiber optic systems can be an inconvenience for those charged with the task of installing them. Not only must the installation technician carry a wide range of connectors to meet the varied requirements of an installation, but a wide range of polishing discs must be carried as well, in order to polish whichever style connector happens to be required for a given splice.

Another problem with existing polishing discs is that they are subject to wear. The polishing paper used to polish the ferrules is naturally abrasive. The constant rubbing of the disc over abrasive polishing paper wears down the lower polishing surface of the disc. This can cause the polishing surface to become uneven. An uneven polishing surface can cause an uneven finish to be imparted to the ferrule which can adversely affect the quality of the splice achieved by the connector.

Another shortcoming of existing polishing discs is that they are generally configured to polish a single connector at a time. It is possible to form multiple ferrule receiving holes in the disc for polishing more than one connector ferrule at a time, however, this often leads to unsatisfactory results. When more than one independent ferrule is to be polished, it is difficult to exert the same amount of downward pressure on each connector to ensure that the face of each ferrule is being adequately polished. Again this can result in an inferior finish being imparted to the face of the ferrules, with the concomitant degradation in the quality of the splice. Thus, the time saving advantage of polishing more than one connector at a time is lost with existing polishing discs.

To overcome the shortcomings of existing fiber optic ferrule polishing discs, it is necessary to develop a universal ferrule polishing apparatus capable of use with a wide variety of fiber optic connector styles. Such an apparatus should have multiple ferrule receiving holes arranged in a pattern such that the ferrules of variety of single and multi-fiber connectors can be inserted into the apparatus, achieving a degree of universality between connector styles. The improved apparatus should also provide means for protecting the lower polishing surface from wear. Preferably the protecting means would be in the form of hardened surfaces (harder than the polishing surface of the improved polishing apparatus) which extend slightly beyond the plane of the polishing surface. Finally, the improved apparatus should be configured to receive tooling adapted to exert uniform downward pressure against multiple connector ferrules inserted into the ferrule receiving holes.

SUMMARY OF THE INVENTION

In light of the background given above, one of the main objectives of the present invention is to provide an improved universal polishing apparatus for use in manually polishing the ferrule faces of a wide variety of fiber optic connectors.

A further object of the present invention is to provide a fiber optic polishing apparatus having an improved pattern of ferrule receiving holes so that the ferrules of various standard dimension multi-ferrule connectors can be inserted therein.

Another objective of the present invention is to provide a ferrule polishing apparatus having a planar polishing surface which is protected against wear.

Still another objective of the present invention is to provide an improved ferrule polishing apparatus wherein hardened surface in the form of sapphire or hardened steel spheres protrude slightly beyond the polishing surface to protect the polishing surface as it is dragged across abrasive polishing paper.

Yet another objective of the present invention is to provide an improved ferrule polishing apparatus configured to receive tooling adapted to evenly apply downward pressure on a group of fiber optic ferrules inserted into the improved polishing apparatus.

An additional objective of the present invention is to provide tooling adapted to exert downward pressure on a group of ferrules inserted into an improved ferrule polishing apparatus.

All of these objectives, as well as others that will become apparent upon reading the detailed description of the presently preferred embodiment of the invention, are met by the improved polishing apparatus herein disclosed.

In the presently preferred embodiment, an improved ferrule polishing apparatus is provided formed of injection molded plastic. The polishing apparatus includes a lower circular disc which forms a lower flat polishing surface. The edges of the lower disc portion are curved upward so that the disc can be easily slid back and forth in every direction in a random fashion over various grades of polishing paper. A grasping ring protrudes from the upper surface of the disc, allowing a technician to grasp the apparatus and randomly maneuver the apparatus over a section of polishing paper. Four post support members are integrally formed with the grasping ring, each having a central bore for receiving a support shaft from tooling configured hold various styles of connectors in place during the polishing procedure.

A series of round ferrule receiving apertures penetrate the lower disc. On the lower side of the disc the ferrule receiving apertures are formed flush with the lower surface, on the upper side, ferrule supports encircle each aperture, extending upward such that round ferrules can be inserted into an apertures and supported vertically by the ferrule supports. In one particular embodiment an additional aperture is provided for receiving the ferrule of an MP connector. A rectangular ferrule support having indented lateral sides corresponding the alignment grooves formed on the sides of MP ferrules encloses the additional aperture. A single MP ferrule is insertable into the additional aperture and supported by the rectangular support.

Tooling is provided to facilitate the polishing of more than one connector at a time. The ferrules of multiple connectors can be inserted into the various apertures to polish a batch of connectors together. The tooling is provided with four support shafts which are insertable into the bores of the four tooling support members integrally formed with the grasping ring. Upon insertion of the tooling support shafts into the support member bores, the tooling engages upper surfaces of the connectors inserted in the ferrule receiving apertures, applying downward force evenly to all of the connectors inserted in into disc so that the face of each ferrule will be polished equally.

Finally, provision is made to protect the bottom surface of the lower disc as it is repeatedly wiped over abrasive polishing paper. Shallow circular cavities are provided for receiving hardened steel or sapphire spheres. When inserted into the cavities the plastic spheres protrude just slightly beyond the bottom surface of the disc. Thus, if a piece of polishing paper is laid on a flat surface and the polishing apparatus is placed on the polishing paper, the sapphire spheres will support the apparatus, and the lower polishing surface will be raised a minute distance above the polishing paper. As the apparatus is wiped back and forth over the polishing paper, the spheres will bear the abrasive action of the polishing paper while the slightly raised surface of the lower disc is protected. The ferrules being polished are held down against the polishing paper by the installed tooling or by the technicians hand. In either case, the ferrules extend just beyond the bottom surface of the lower disc to engage the polishing paper and are polished smooth thereby.

DETAILED DESCRIPTION OF THE PRESENTLY PREFERRED EMBODIMENTS

Figure 1:
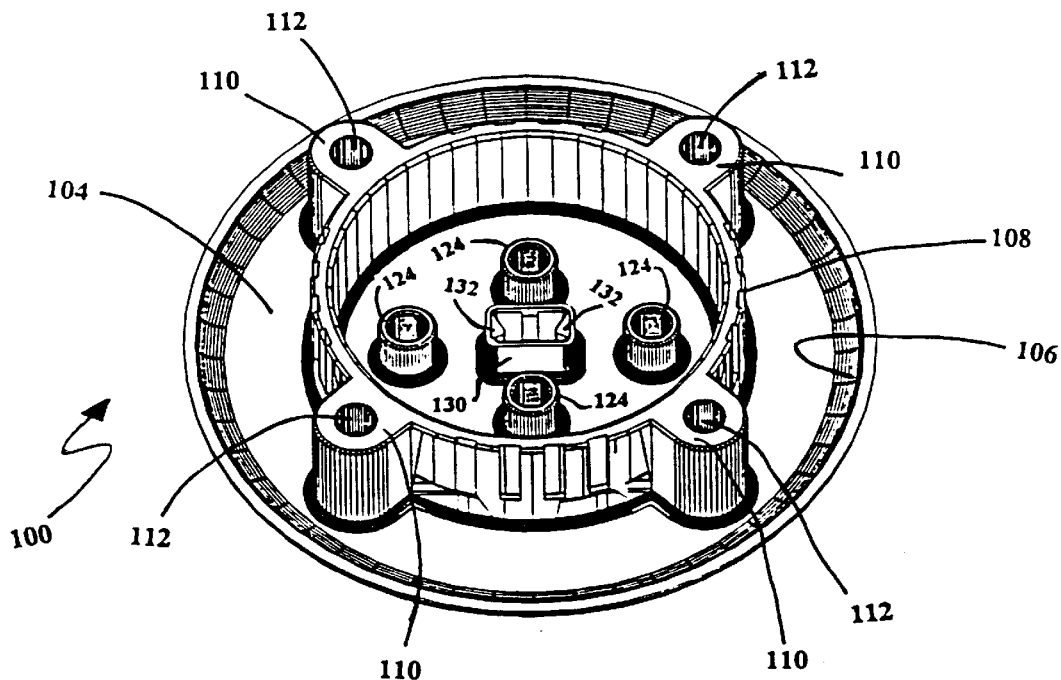
FIG. 1 is a perspective view showing the upper surfaces of a polishing apparatus and tooling according to the present invention.
Figure 2:
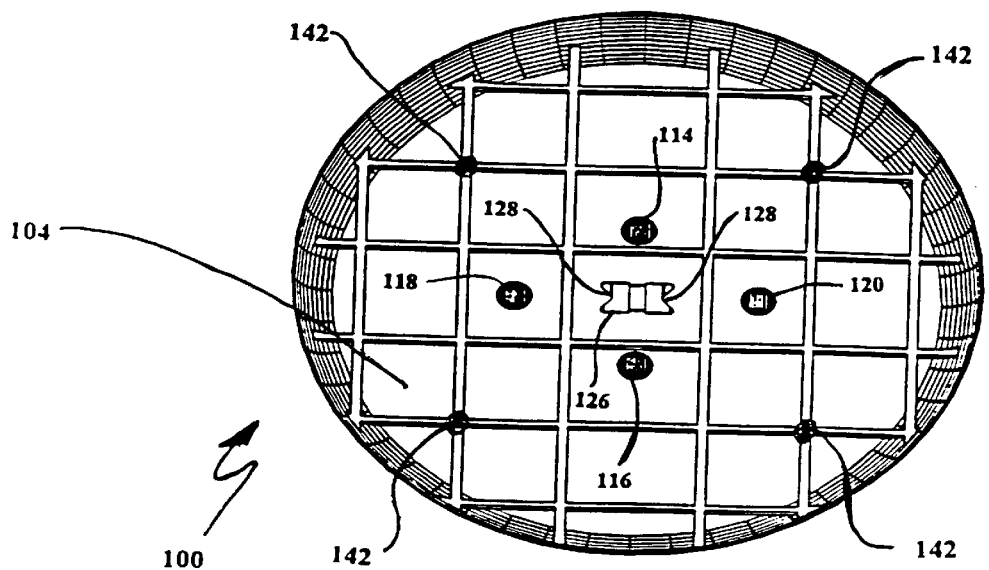
FIG. 2 is a perspective view showing the lower surfaces of a polishing apparatus according to the present invention.

Referring to FIGS. 1 and 2, an apparatus for manually polishing fiber optic connectors according to the present invention is shown. The apparatus includes a polishing disc 100, and cooperative tooling 102 for applying uniform downward pressure on connector ferrules inserted into the polishing disc.

The polishing apparatus 100 is formed with a lower circular plate 104 having upwardly curved edges 106. The lower plate 104 is formed of injection molded plastic approximately 1/16" thick. A circular grasping ring 108 is molded with the lower disc portion 104, and extends upward therefrom. Integrally formed with the grasping ring 108 are four tooling support members 110. The tooling support members are spaced in a square pattern around, and tangent to grasping ring 108. A circular bore 112 is formed vertically within each support member 110.

As can best be seen in FIG. 2, four circular apertures 114, 116, 118 and 120, are formed in lower plate 104. Apertures 114 and 116 are spaced 0.500" apart from center to center, along the transverse axis of lower plate 104. Apertures 118 and 120 are spaced 0.700" apart from center to center, along the lateral axis of plate 104. The size, location, and spacing of apertures 114, 116, 118, 120 are such that the ferrules of various style of fiber optic connectors can be inserted into the apertures for polishing. Apertures 114, 116, being 0.500" apart are configured to receive the two ferrules of a standard SC-Duplex connector. Apertures 118, 120, being space 0.700" apart are configured to receive the ferrules of a standard ESCON connector. This aperture spacing also allows from one to four single ferrule connectors such as SC, FC, or ST to be inserted into apertures 114,116,118 and/or 120 of plate 104. Thus, the ferrules of up to four single ferrule style connectors can be polished simultaneously. A fifth aperture 126 is also provided. Unlike the first four apertures, aperture 126 is not round, but more or less rectangular in shape for receiving the more broadly shaped MP connector ferrule. Triangular indentations 128 are formed on the lateral sides of the aperture for engaging the guide grooves formed on the sides of the MP ferrule.

Turning back to FIG. 1, it can be seen that on the upper surface 122 of lower plate 104, each of the four circular apertures 114, 116, 118, 120 is surrounded by a ferrule support member 124. A rectangular support member 130 having triangular indentations 132 on the lateral sides, is formed around aperture 126. The ferrule support members 124, 128 vertically support connector ferrules upon their insertion into apertures 114, 116, 118, 120, and 126.

Figure 3:
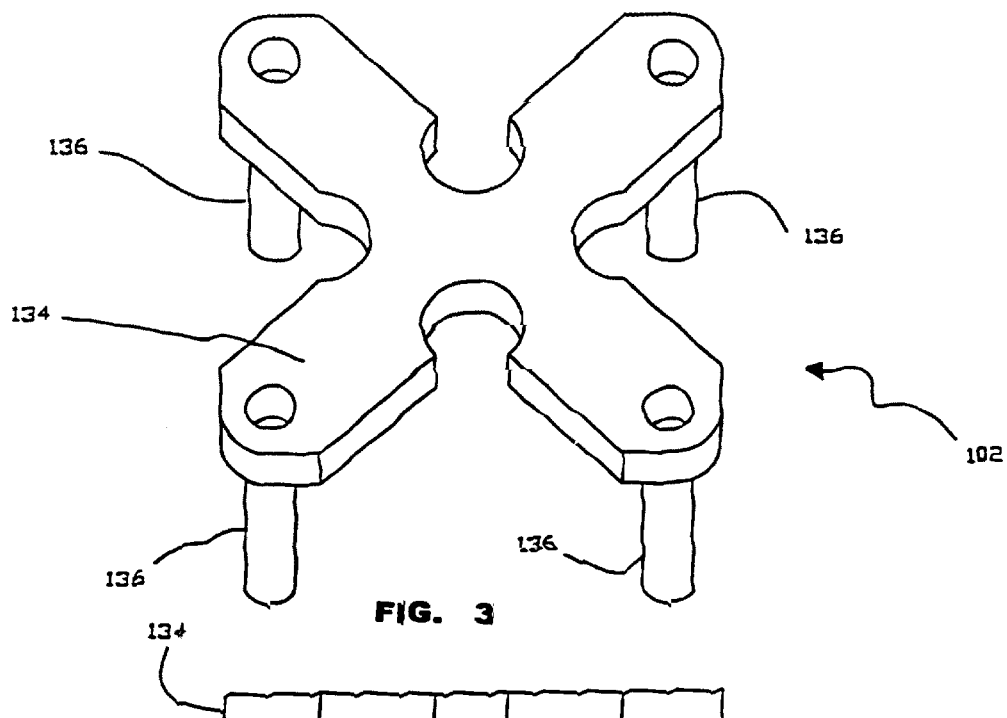
FIG. 3 is a perspective view showing a connector hold-down tool according to the present invention.
Figure 4:
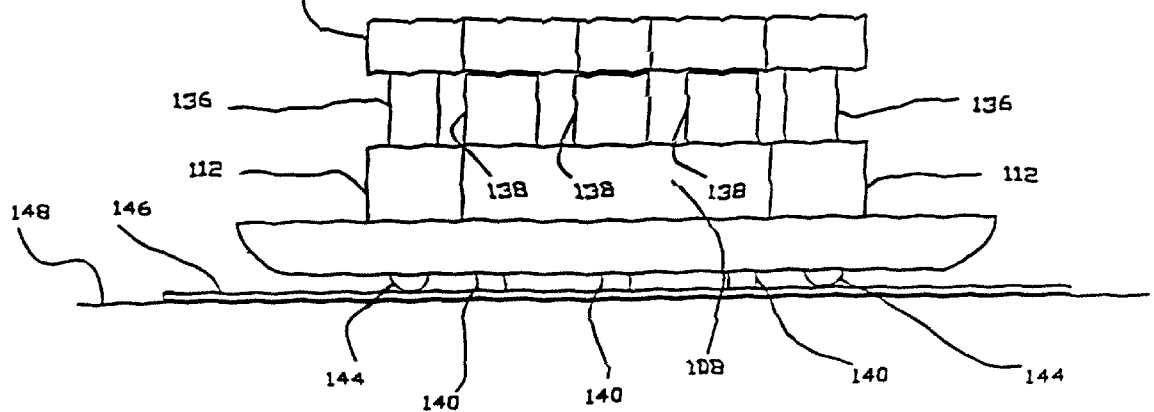
FIG. 4 is a side elevation view of a polishing apparatus and holddown tooling according to the present invention having four FC style fiber optic connectors inserted therein.

Referring now to FIGS. 3 and 4, tooling is provided for holding connectors in place during the polishing operation, and for exerting downward pressure on the connector ferrules as the polishing apparatus is maneuvered back and forth over a sheet of polishing paper. Tooling 102, shown in FIG.s 3 and 4 is an example of such tooling configured for use in conjunction with ST, FC and SC style connectors. It should be noted that the particular tooling shown in FIGS. 1 and 3 is shown for illustrative purposes only. Alternate tooling can be provided for use with other style connectors. The scope of the present invention should be in no way considered as limited to the particular embodiment shown in FIGS. 3 and 4. Tooling 102 is formed with a holddown member 134, and support shafts 136. The support shafts 136 are located so as to slidably engage bores 112 formed in support members 110. Support shafts 136 slide into bores 112 until holddown member 134 rests on the top surfaces of fiber optic connectors 138 inserted into polishing disc 100. Tooling 102 can be pressed downward by a technician using the polishing apparatus to exert downward force on the connector ferrules to ensure an even polished finish on the face of each ferrule 140.

Referring now to FIGS. 2 and 4, means provided for protecting the bottom surface of lower plate 104 are now described. Cavities 142 configured to receive sapphire or hardened steel spheres 144 are formed in the bottom surface of lower plate 104. Sapphire spheres are spherical glass beads formed of a glass much harder than the plastic that forms lower plate 104. As can be seen in FIG. 4, the spheres protrude just beyond the bottom surface of plate 104. A sheet of polishing paper 146 is laid over a flat surface 148. The sapphire spheres 144 contact the polishing paper 146, and raise the entire polishing apparatus above the polishing paper. Thus, as the polishing disc 100 is wiped across the polishing paper 146, the abrasive action of the polishing paper acts mainly against the sapphire spheres, rather than the lower surface of plate 104. The ferrules 140 inserted into the apertures 114–120, also extend beyond the lower surface of plate 104 to contact the polishing paper 146. Holddown member 134 presses down against the connectors 138, applying downward pressure against the connector ferrules 140. The downward pressure against the ferrules ensures thorough, even polishing action against the face of each ferrule 140.

In addition to the four cavities 142, the bottom surface of plate 104 is also provided with a series orthogonal channels 143 which criss-cross the lower surface. Channels 143 allow the surface of plate 104 to slide easily over a sheet of polishing film when using a wet polishing process. In the absence of channels 143, wet polishing causes plate 104 to stick to the polishing paper, thereby making polishing more difficult.

From the preceding description, it should be clear that the present invention provides an apparatus for manually polishing the end face portion of fiber optic connector ferrules. Ferrule receiving apertures 114–120 are arranged in a pattern which allows the ferrules of a variety of single and multi-fiber connectors to be inserted into the apparatus, and polished thereby. Tooling 102 is provided to cooperate with polishing disc 100 to provide downward pressure against connector ferrules inserted into the ferrule receiving apertures 114–120. Finally, Cavities 142 are provided for accepting "sapphire spheres" which act to raise the lower surface of the polishing disc, thereby protecting the polishing disc from the abrasive effects of polishing paper.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

What is claimed is:

1. A universal polishing apparatus for polishing various simplex and duplex style fiber optic connector ferrules inserted therein, said connectors having at least one said ferrule, said polishing apparatus comprising:

a disc having an upper surface and a lower polishing surface, said disc defining a plurality of circular ferrule receiving apertures, a first pair of said apertures spaced a first distance apart, and a second pair of said apertures being spaced a second distance apart, said first distance being different than said second distance; and a handle comprising a ring integrally molded with said disc such that the ring extends from said upper surface of said disc for manually maneuvering said apparatus over polishing paper adapted for polishing fiber optic ferrules.

2. The polishing apparatus of claim 1 wherein said disc planar array multi-fiber ferrule receiving aperture communicating between the upper surface and the lower surface for polishing planar array multi-fiber connector ferrules.

3. The polishing apparatus of claim 2 wherein said planar array multi-fiber ferrule receiving aperture is rectangular in shape, and includes alignment indentations formed on the lateral sides thereof.

4. The polishing apparatus of claim 2 further comprising a ferrule support skirt extending upward from said upper surface of said disc around the perimeter of said planar array multi-fiber ferrule receiving aperture.

5. The polishing apparatus of claim 1 further comprising a plurality of ferrule support skirts extending upward from said upper surface of said disc around the perimeter of each of said plurality of ferrule receiving apertures.

6. The polishing apparatus of claim 1 further comprising a plurality of tooling support members integrally formed with said grasping ring, each said tooling support member defining a support shaft receiving bore.

7. The polishing apparatus of claim 6 further comprising an holddown tool wherein the holddown tool comprises:

a plurality of support shafts arranged to slidably engage said support shaft receiving bores; and a horizontal member extending between said support shafts, and having a bottom surface configured to engage one or more connector ferrules and apply a downward force thereon as said support shafts are inserted into said support shaft receiving bores.

8. The polishing apparatus of claim 1 wherein said lower surface is provided with wear resistant surfaces protruding from said lower surface to protect said lower surface from abrasion as the polishing apparatus is maneuvered over polishing film.

9. The polishing apparatus of claim 1 wherein said lower surface is formed with a plurality of channels traversing said lower surface, said channels acting to channel water away from said lower surface during a wet polishing operation.

10. The polishing apparatus of claim 1 wherein said first distance equals 0.007" and said second distance equals 0.005".

11. The polishing apparatus of claim 1 wherein one of said first and second distances equals 0.250".

12. A polishing apparatus for holding at least one fiber optic connector ferrule in an upright position while allowing an end face portion of said at least one connector ferrule to be held firmly against a planar sheet of ferrule polishing paper as said apparatus is manually maneuvered over said polishing paper, said polishing apparatus comprising:

a disc having a polishing surface and an upper surface opposite said polishing surface;

a plurality of ferrule support skirts extending upward from said upper surface, said ferrule support skirts define internal circular bores communicating with said polishing surface such that fiber optic connector ferrules may be inserted into said bores with the face portion of said ferrules extending beyond said polishing surface;

a handle extending from said upper surface;

tooling support members integrally for med with said handle; and wear resistant surfaces protruding slightly from said polishing surface to protect said polishing surface from abrasion from said polishing paper.

13. The polishing apparatus of claim 12 wherein a first pair of said ferrule support skirts are positioned on a transverse axis of said disc, and spaced 0.005" apart, a second pair of said ferrule support skirts are positioned on a lateral axis of said disc, and spaced 0.007" apart.

14. The polishing apparatus of claim 12 further comprising a rectangular support skirt extending from said upper surface, said rectangular support skirt defining a generally rectangular shaped bore for receiving a multi-fiber connector ferrule.

15. The polishing apparatus of claim 14 wherein said rectangular support skirt is configured to receive an MP ferrule, said rectangular shaped bore having alignment indentations formed on the lateral sides thereof.

16. The polishing apparatus of claim 12 wherein said handle comprises a circular ring integrally molded with said disc.

17. The polishing apparatus of claim 12 further comprising tooling for exerting an application force against said at least one ferrule, said tooling having a connector holddown member and a plurality of tooling support shafts, said support members defining bores configured to receive said support shafts.

18. The polishing apparatus of claim 12 wherein a plurality of shallow cavities are formed in said polishing surface of said disc, said cavities having hardened plastic spheres impressed therein, said spheres being provided to absorb the abrasive action of said polishing paper thereby protecting said polishing surface from wear.

19. A holddown tool for use with a polishing apparatus for simultaneously polishing a plurality of fiber optic connector ferrules inserted within said polishing apparatus, the holddown tool comprising:

a holddown member configured engage an upper portion of said fiber optic connector ferrules inserted within said polishing apparatus, said holddown member applying a downward force against said connectors ferrules; and a plurality of support shafts extending from said holddown member, said support shafts being configured to engage corresponding tool support members formed on said polishing apparatus.

20. A polishing apparatus for holding at least one fiber optic connector ferrule in an upright position while allowing an end face portion of said at least one connector ferrule to be held firmly against a planar sheet of polishing paper as said apparatus is manually maneuvered over said polishing paper, said polishing apparatus comprising:

a disc having a polishing surface and an upper surface opposite said polishing surface;

an MP ferrule support skirt extending from said upper surface of said disc, said MP ferrule support skirt defining a rectangular shaped bore having alignment indentations formed on the lateral sides thereof;

means for forming a handle extending from said upper surface of said disc;

tooling support members integrally formed with said handle means; and wear resistant surfaces protruding slightly from said polishing surface to protect said polishing surface from abrasion from said polishing paper.

* * * * *